(12) United States Patent
Fujikake et al.

(10) Patent No.: US 12,024,091 B2
(45) Date of Patent: Jul. 2, 2024

(54) TIRE STATE MANAGEMENT SYSTEM AND TIRE STATE MANAGEMENT PROGRAM

(71) Applicant: BRIDGESTONE CORPORATION, Tokyo (JP)

(72) Inventors: Kanae Fujikake, Tokyo (JP); Hideyuki Kaneda, Tokyo (JP); Teppei Mori, Tokyo (JP); Masafumi Daifuku, Tokyo (JP); Kei Tsuchiya, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 791 days.

(21) Appl. No.: 17/057,150

(22) PCT Filed: Apr. 15, 2019

(86) PCT No.: PCT/JP2019/016169
§ 371 (c)(1),
(2) Date: Nov. 20, 2020

(87) PCT Pub. No.: WO2019/225212
PCT Pub. Date: Nov. 28, 2019

(65) Prior Publication Data
US 2021/0221288 A1    Jul. 22, 2021

(30) Foreign Application Priority Data

May 25, 2018   (JP) ................................ 2018-100696

(51) Int. Cl.
*B60Q 9/00*         (2006.01)
*B60C 19/00*        (2006.01)
(Continued)

(52) U.S. Cl.
CPC ................ *B60Q 9/00* (2013.01); *B60C 19/00* (2013.01); *B60C 25/007* (2013.01);
(Continued)

(58) Field of Classification Search
CPC ......... B60Q 9/00; B60C 19/00; B60C 25/007; B60C 25/0554; B60C 2019/004; G06Q 10/20; G06R 7/20; G06T 2207/30248
See application file for complete search history.

(56) References Cited

U.S. PATENT DOCUMENTS 5,357,799 A  * 10/1994 Roth ................... G01M 17/027
                                                     73/146
8,618,924 B2 * 12/2013 Fujisawa .............. G01B 11/245
                                                     73/146
(Continued)

FOREIGN PATENT DOCUMENTS

JP         2002-131191 A      5/2002
JP         2005-170182 A      6/2005
(Continued)

OTHER PUBLICATIONS

International Search Report of PCT/JP2019/016169 dated Jul. 16, 2019 [PCT/ISA/210].
(Continued)

*Primary Examiner* — Gertrude Arthur Jeanglaude
(74) *Attorney, Agent, or Firm* — Sughrue Mion, PLLC

(57) ABSTRACT

A tire state management system (10) is provided with an image data acquisition unit (210) for acquiring 1st image data acquired by imaging the outer surface at a first timing and second image data acquired by imaging the outer surface at a second timing later than the first timing, a damage portion acquisition unit (220) for acquiring a damage included in the 1st image data and a damage included in the 2nd image data, a vehicle operation information acquisition unit (230) for acquiring operation information of a vehicle on which a tire is mounted, and a maintenance prediction unit (240) for estimating a progress speed based on the damage included in the 1st image data and the progress speed included in the 2nd image data and predicting a maintenance timing for the tire based on the progress speed and the operation information.

7 Claims, 6 Drawing Sheets

(51) Int. Cl.
  *B60C 25/00* (2006.01)
  *B60C 25/05* (2006.01)
  *G06Q 10/20* (2023.01)
  *G06T 7/20* (2017.01)

(52) U.S. Cl.
  CPC ......... *B60C 25/0554* (2013.01); *G06Q 10/20* (2013.01); *G06T 7/20* (2013.01); *B60C 2019/004* (2013.01); *G06T 2207/30248* (2013.01)

(56) References Cited

U.S. PATENT DOCUMENTS

| | | | |
|---|---|---|---|
| 9,672,665 | B1 | 6/2017 | Kraft et al. |
| 10,760,898 | B2 * | 9/2020 | Nobis .................... G01N 21/95 |
| 2009/0205405 | A1 | 8/2009 | Bauchot et al. |
| 2013/0002856 | A1 * | 1/2013 | Mizutani ................ G01B 11/24 348/128 |
| 2015/0139498 | A1 | 5/2015 | Rotatori et al. |
| 2017/0124784 | A1 | 5/2017 | Wittmann et al. |

FOREIGN PATENT DOCUMENTS

| | | |
|---|---|---|
| JP | 2006-327368 A | 12/2006 |
| JP | 2011-53059 A | 3/2011 |
| JP | 2016-018463 A | 2/2016 |
| JP | 2017-156295 A | 9/2017 |
| KR | 10-2014-0021137 A | 2/2014 |
| KR | 10-1425019 B1 | 8/2014 |
| WO | 2017/060739 A1 | 4/2017 |

OTHER PUBLICATIONS

Examination Report issued Nov. 24, 2021 in Australian Application No. 2019273970.

* cited by examiner

TIRE STATE MANAGEMENT SYSTEM AND TIRE STATE MANAGEMENT PROGRAM

TECHNICAL FIELD

The present invention relates to a tire state management system and a tire state management program for managing the state of the tire.

BACKGROUND ART

Conventionally, there has been known a method of automatically detecting two kinds of temporal changes, i.e., temporal changes (rust, cracks, discoloration, etc.) of an object itself and relative changes (tilting of utility poles, etc.) of the object to the background, based on two pieces of temporal image data acquired by a terminal device having a photographing function and a positioning function (see Patent Document 1).

More specifically, Patent Document 1 discloses that, based on an image of an object and a past image of the object, both a temporal change in the object itself and a relative temporal change in the background of the object are detected by aligning the past and current images of the object by changing the weights of the feature points calculated from the part of the object and the feature points calculated from the background.
[Citation List]
[Patent Literature]
[PTL 1] Japanese Patent Application Laid-Open No. 2016-18463

SUMMARY OF INVENTION

In the method for detecting the temporal changes described in Patent Document 1, both the temporal changes of the object itself and the temporal changes relative to the background of the object can be detected, but it is difficult to estimate the temporal changes of the object itself.

In particular, in a tire mounted on a vehicle (construction vehicle) traveling on a rough terrain such as a mine (tire for construction vehicle), an outer surface of the tire, specifically, a tire side portion and a tread portion are liable to be damaged such as cracks, and it is important for the safe and efficient operation of the construction vehicle to estimate the change with time of such damage, that is, the progress speed of the damage.

Therefore, it is an object of the present invention to provide a tire state management system and a tire state management program capable of estimating the progress speed of the damage generated on the outer surface of the tire with high accuracy and predicting the maintenance timing of the tire.

One aspect of the present invention is a tire state management system (tire state management system 10) for estimating the progress speed of a damage (Crack C1, Crack C2) generated on the outer surface (tire side portion 21a) of a tire (for example, a tire 21) and managing the state of the tire. The tire state management system includes an image data acquisition unit (image data acquisition unit 210) for acquiring first image data acquired by imaging the outer surface at a first timing and second image data acquired by imaging the outer surface at a second timing later than the first timing, a damage portion acquiring unit (damage portion acquisition unit 220) for acquiring the damage included in the first image data and the damage included in the second image data, a vehicle operation information acquisition unit (vehicle operation information acquisition unit 230) for acquiring operation information of a vehicle on which the tire is mounted, and a maintenance prediction unit (maintenance prediction unit 240) for estimating the progress speed based on the damage included in the first image data and the damage included in the second image data, and predicting the maintenance timing for the tire based on the progress speed and the operation information.

One aspect of the present invention is a tire state management program for estimating the progress speed of a damage generated on the outer surface of a tire and managing the state of the tire. The tire state management program causing a computer to execute an image data acquisition processing for acquiring first image data acquired by imaging the outer surface at a first timing and second image data acquired by imaging the outer surface at a second timing later than the first timing, a damage portion acquiring process for acquiring the damage included in the first image data and the damage included in the second image data, a vehicle operation information acquiring process for acquiring operation information of a vehicle on which the tire is mounted, and a maintenance prediction processing for estimating the progress speed based on the damage included in the first image data and the damage included in the second image data, and predicting the maintenance timing for the tire based on the progress speed and the operation information.

DESCRIPTION OF EMBODIMENTS

Hereinafter, an embodiment will be described based on the drawings.

Figure 1:
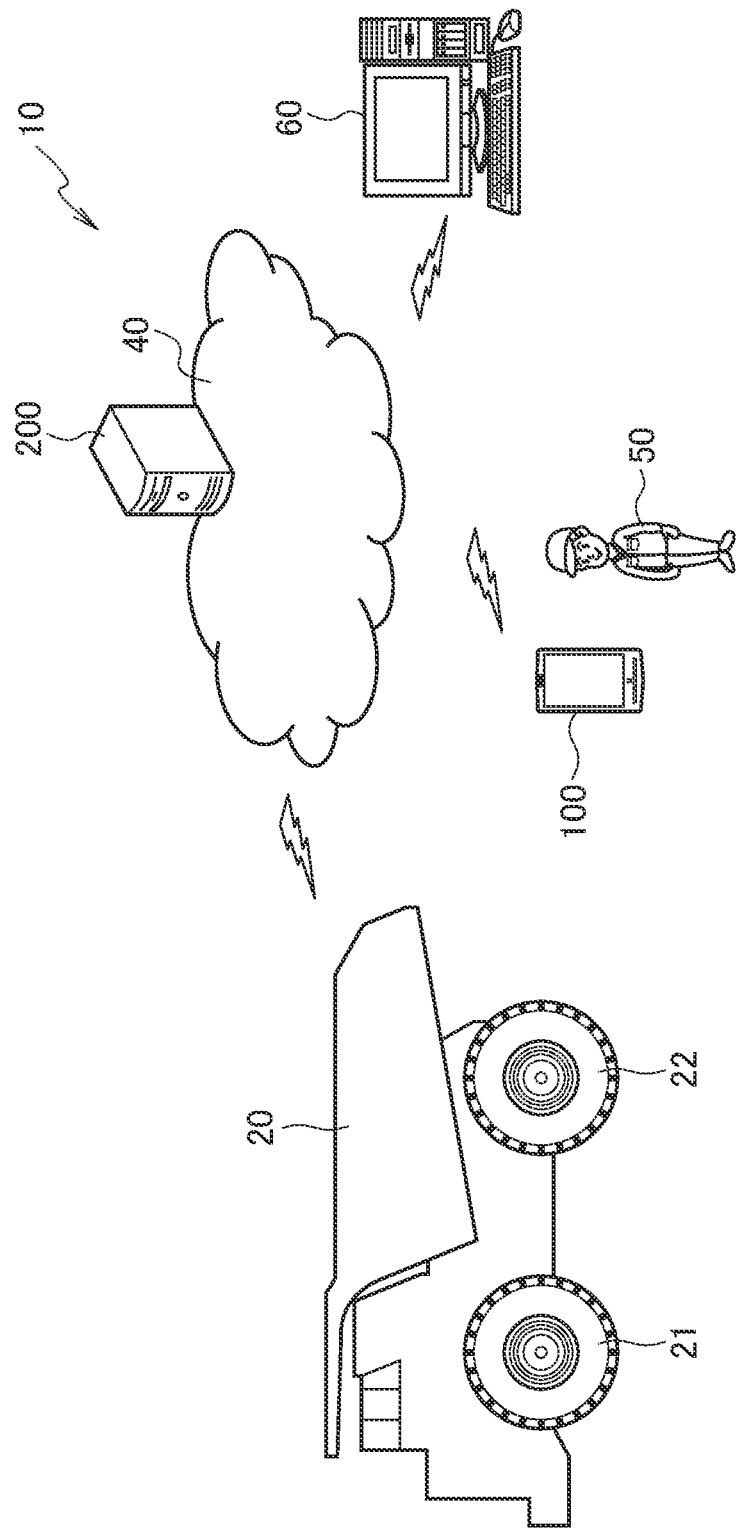
FIG. 1 is an overall schematic diagram of a tire state management system 10.

It should be noted that the same or similar reference numerals are given to the same functions and structures, and the description thereof will be omitted as appropriate.
(1) Overall schematic configuration of tire state management system FIG. 1 is an overall schematic configuration diagram of a tire state management system 10 according to the present embodiment. As shown in FIG. 1, the tire state management system 10 includes a terminal device 60, a portable terminal 100, and a tire information management server 200. The terminal device 60, the portable terminal 100 and the tire information management server 200 are connected through a communication network 40.

The construction vehicle 20 is a vehicle traveling on uneven ground such as a mine. Specifically, the construction vehicle 20 is a large dump truck. The construction vehicle 20 has a radio communication function and can be connected via the communication network 40 to the tire state management system 10.

The construction vehicle 20 is mounted with a tire 21 and a tire 22. The tire is mounted at a front wheel position, and the tire 22 is mounted at a rear wheel position. The configuration of the rear wheel may be a double tire.

Figure 2:
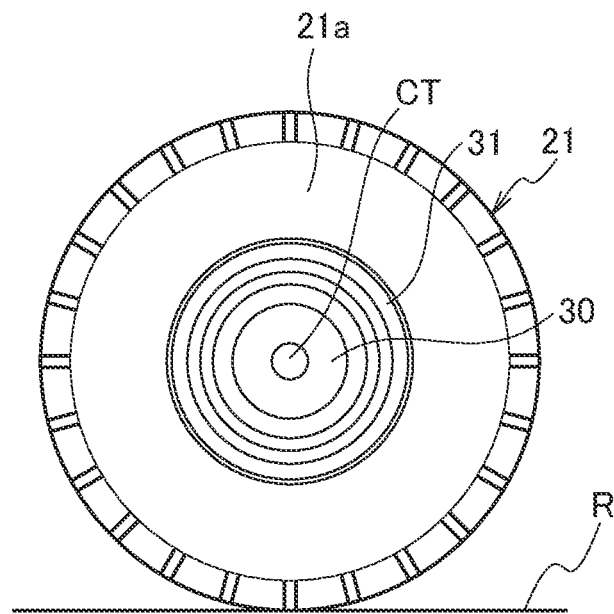
FIG. 2 is a side view of a single piece of tire 21.

Since the construction vehicle 20 travels on an uneven ground, a sharp stone or the like on the road surface R (not shown in FIG. 1, see FIG. 2) tends to cause a cut flaw (crack) in a tire side portion 21a (See FIG. 2). In particular, cracks are likely to occur in the tire side portion 21a on the side outer side when the vehicle is mounted with a tire.

The worker 50 is engaged in the operation of the construction vehicle 20. Specifically, the worker 50 manages the state of the tire 21 and the tire 22 mounted on the construction vehicle 20, and performs work corresponding to the necessity of tire replacement or repair. The worker 50 can use the terminal device 60 and the portable terminal 100.

The terminal device 60 is typically implemented by a personal computer located in a field management office (backyard), such as a mine. The terminal device 60 is used for retrieval and acquisition of tire information managed by the tire information management server 200.

The portable terminal 100 is typically implemented by a portable communication terminal such as a smartphone or tablet terminal that is connectable to a mobile communication network (PLMN). Similar to the terminal device 60, the portable terminal 100 is used for retrieval and acquisition of tire information managed by the tire information management server 200.

The tire information management server 200 manages information related to the tire 21 and the tire 22. Specifically, the tire information management server 200 holds the type of the construction vehicle 20, the sizes of the tires 21, the tires 22, and rim wheels 30 (not shown in FIG. 1, see FIG. 2), setting information (set pressure according to load, etc.), and the use history of the tires 21, the tires 22, and the rim wheels 30 (driving time, distance traveled, presence/absence of attachment/detachment, etc.).

The tire information management server 200 update the use history or the like in response to an input from the terminal device 60 or the portable terminal 100.

In particular, in the present embodiment, the tire information management server 200 estimates the progress speed of the damage generated on the outer surfaces of the tires 21 and 22, and manages the states of the tires 21 and 22.

FIG. 2 is a side view of the tire 21. As shown in FIG. 2, the tire 21 is assembled to the rim wheel 30. The tire 22 is also assembled to the rim wheel 30 like the tire 21.

The rim wheel 30 has a predetermined radial size (for example, 63 inches) corresponding to the specifications of the construction vehicle 20. An outer peripheral part of the rim wheel 30 is formed with a rim flange portion 31. The shape of the rim flange portion 31 (size) is different according to the specification of the rim wheel 30.

The radial size is a distance from the center CT of the rim wheel 30 to the radially outer end of the rim wheel 30, which is 2 times the linear distance (diameter), and does not include the rim flange portion 31.

The outer diameter of the tire 21 is the sum of the radial size of the rim wheel 30 and the radial size of the tire side portion 21 a. The tire side portion 21a refers to a portion from an inner end of a bead portion (not shown) of the tire 21 in a tire radial direction to a ground contact end of a tread portion (not shown) of the tire 21 with a road surface R in a tire width direction.

However, the imaging range in the side view of the tire 21 may be interpreted as the tire side portion 21a.

(2) Functional block configuration of tire state management system

Next, a functional block configuration of the tire state management system 10 will be described. Specifically, the functional block configuration of the tire information management server 200 will be described.

Figure 3:
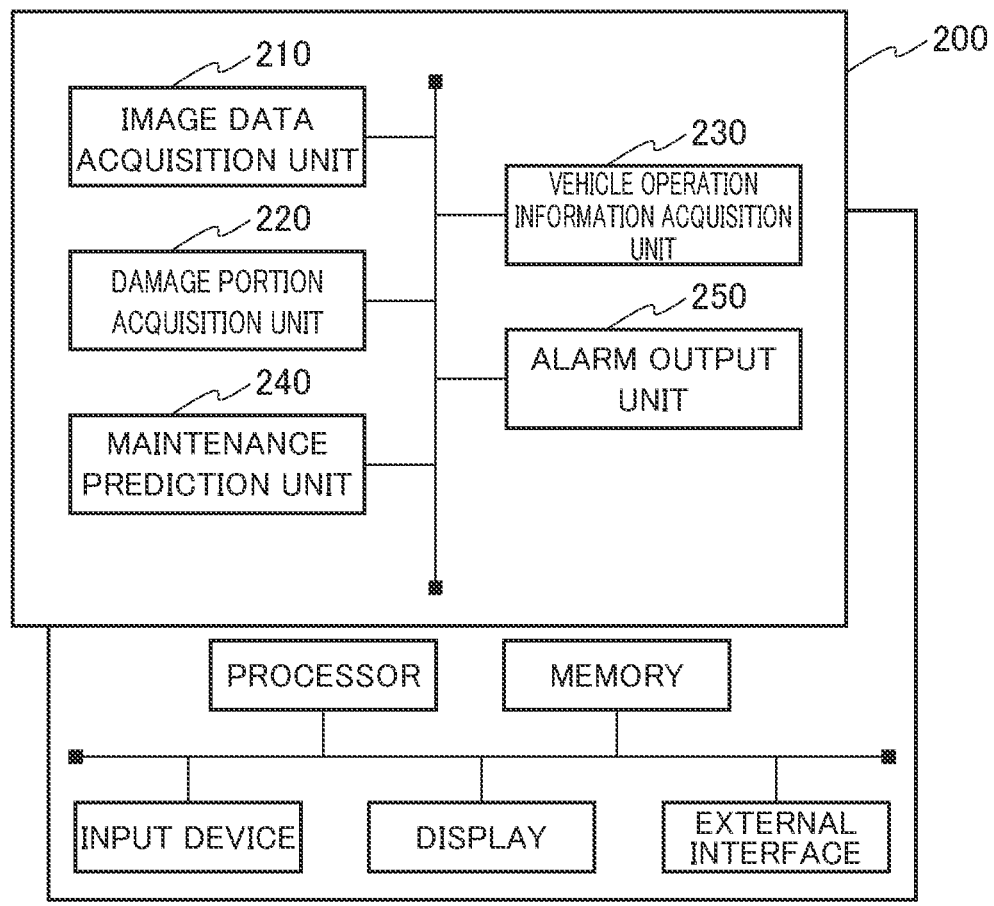
FIG. 3 is a functional block diagram of the tire information management server 200.

FIG. 3 is a functional block diagram of the tire information management server 200. As shown in FIG. 3, the tire information management server 200 includes an image data acquisition unit 210, a damage portion acquisition unit 220, a vehicle operation information acquisition unit 230, a maintenance prediction unit 240, and an alarm output unit 250.

These functional blocks are implemented by executing a computer program (software) on hardware such as a server computer. Specifically, the tire information management server 200 includes, as hardware elements, a processor, a memory, an input device, a display, and an external interfaces. The computer program (software) may be provided via the communication network 40 or may be recorded on a computer-readable recording medium such as an optical disk, a hard disk drive, or a flash memory.

An image data acquisition unit 210 acquires image data acquired by imaging the tire 21 (and the tire 22, and same as below). In the present embodiment, the image data acquisition unit 210 acquires image data acquired by imaging the outer surface of the tire 21 using the camera function mounted on the portable terminal 100 by the worker 50 via the communication network 40.

Specifically, the image data acquisition unit 210 acquires 1st image data acquired by imaging the outer surface of the tire 21 at 1st timing. In this embodiment, the image data acquisition unit 210 acquires image data acquired by imaging the tire side portion 21a.

An image data acquisition unit 210 acquires 2nd image data acquired by imaging the outer surface of the tire 21 at a 2nd timing later than the 1st timing.

A damage portion acquisition unit 220 acquires a damage included in the 1st image data acquired by the image data acquisition unit 210 and a damage included in the 2nd image data.

The damage is, as described above, a damage caused on the outer surface of the tire 21, and is typically a crack. However, the damage is not necessarily limited to a crack if it is a damage that may develop in accordance with the use of the tire 21.

The identification of the damage (crack) included in the 1st image data and the 2nd image data may be manually designated by the operator 50 or may be automatically performed by image processing.

A vehicle operation information acquisition unit 230 acquires operation information of a construction vehicle 20 mounted with the tire 21.

The operation information acquired by the vehicle operation information acquisition unit 230 includes an operation time of the construction vehicle 20 (including the operation and maintenance periods), a travel distance, a travel speed, a load, or a combination thereof (For example, load x distance travelled, load x speed travelled (T·km/h)).

The operation information includes past (operation history) and future (operation schedule) information. Further, the operation information may include information regarding the traveling route of the construction vehicle 20 (slope, road conditions (types of graded or irregular ground), etc.) and the internal pressure and temperature of the tire 21.

A maintenance prediction unit 240 predicts maintenance timing for the tire 21. Specifically, the maintenance prediction unit 240 estimates the progress speed of the damage based on the damage included in the 1st image data and the damage included in the 2nd image data. Further, the maintenance prediction unit 240 predicts the maintenance timing for the tire 21 based on the progress speed and the operation information acquired by the vehicle operation information acquisition unit 230.

More specifically, the maintenance prediction unit 240 estimates, based on the cracks C1 (see FIG. 7) included in the 1st image data and the cracks C2 (see FIG. 8) included in the 2nd image data, how the cracks develop after the imaging timing (second timing) of the 2nd image data.

A maintenance prediction unit 240 determines the progress degree of the crack from the 1st timing to the 2nd timing from the difference between the information of the crack C1 and the information of the crack C2. Further, the maintenance prediction unit 240 estimates the future progress speed of the crack based on the operation information of the construction vehicle 20 from the 1st timing to the 2nd timing and the operation information of the construction vehicle 20 after the 2nd timing (Schedule).

Specifically, the maintenance prediction unit 240 divides the difference between the size of the crack C2 and the size of the crack C1 by the traveling time of the construction vehicle 20 from the detection timing of the crack C1 (First Timing) to the detection timing of the crack C2 (Second Timing) (or distance travelled) to estimate the progress speed of the crack.

A maintenance prediction unit 240 predicts maintenance timing for the tire 21 based on the estimated progress speed and operation information. In the present embodiment, the maintenance prediction unit 240 can predict the use limit timing at which the tire 21 becomes the use limit (lifetime) based on the progress speed and the operation information.

The use limit timing can be distinguished into a use limit at which the tire 21 can be reused by repairing (repair usable limit) and a limit at which the tire 21 can never be used (absolute limit of use).

A maintenance prediction unit 240 predicts the timing when the tire 21 becomes the use limit based on the difference between the size of the crack where the tire 21 becomes the use limit (repairable or absolute limits of use) and the size of the present crack and the operation schedule of the construction vehicle 20 (estimated travel distance, estimated travel time, etc.).

The predicted timing can be indicated by the date and time when the limit of use is reached, the travel distance or the travel time until the limit of use is reached. The operation schedule of the construction vehicle 20 may include information on the load and the traveling route of the construction vehicle 20 (slope, etc.). That is, the maintenance prediction unit 240 may include a future operation plan (estimated loading capacity, driving route, etc.) included in the operation information of the construction vehicle 20 and predict the timing at which the tire 21 becomes the use limit.

The information of the cracks C1 and C2 (crack information) typically includes the length and width of the crack, but may also include the depth and area of the crack. Alternatively, instead of the length and width of the crack, the propagation rate may be estimated based on the area of the crack.

The association between the crack C1 and the crack C2 (that is, the crack C1 grows into the crack C2,) may be manually designated by the worker 50 or may be automatically performed by image processing. In the case of image processing, a simple method includes a method of using a reference point (coordinates) capable of specifying the position of a crack on the tire 21 side (marking of tire side portion 21a, etc.).

A specific method for predicting the maintenance timing of the tire 21 will be described later.

An alarm output unit 250 outputs an alarm corresponding to the use limit timing predicted by the maintenance prediction unit 240.

Specifically, the alarm output unit 250 can output an alarm indicating that maintenance of the tire 21 is necessary. At least one of the terminal device 60 and the portable terminal 100 can be selected as the output destination of the alarm. Also, a communication device (not shown) mounted via the communication network 40 on the construction vehicle 20 can be selected as an output destination.

The alarm output unit 250 can also output an alarm indicating that maintenance of the tire 20 is required during the next maintenance period of the construction vehicle 21.

(3) Operation of the tire state management system

Next, the operation of the tire state management system 10 will be described. Specifically, the following describes the estimation of the progress speed of the damage (crack) caused on the outer surface of the tire 21 and the alarm output operation.

Figure 4:
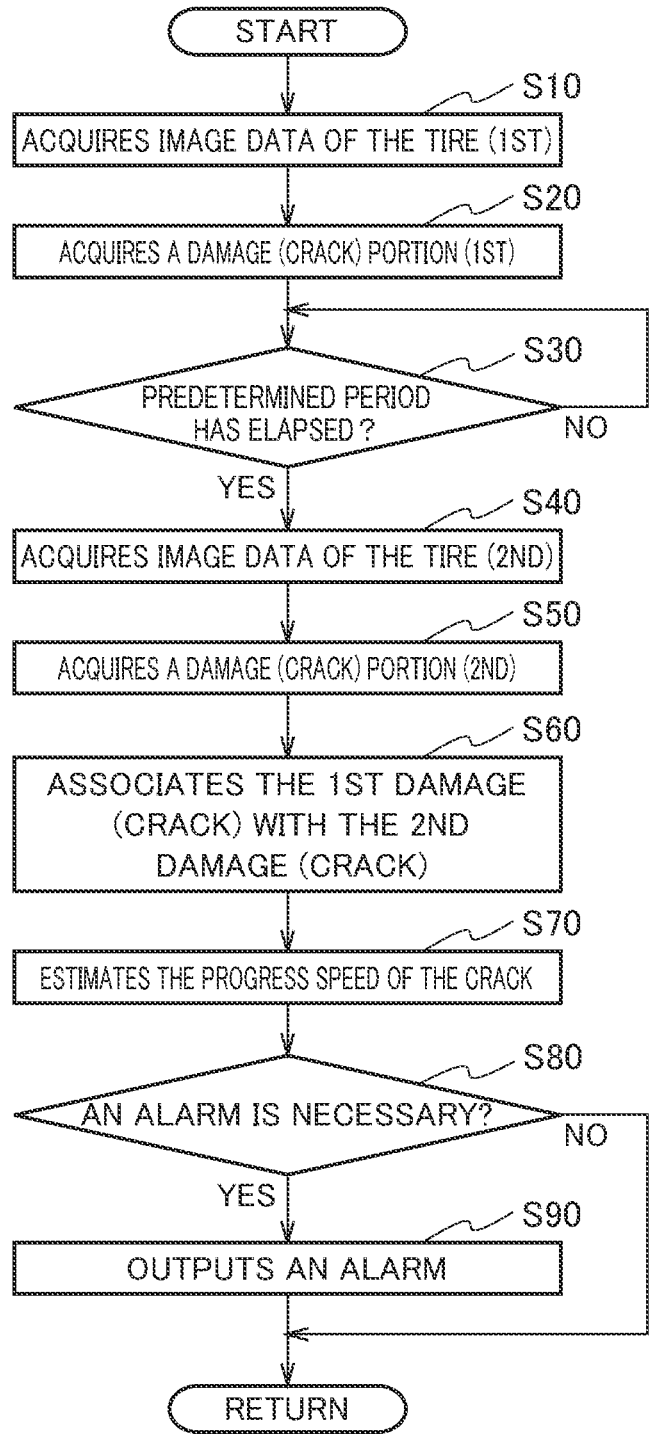
FIG. 4 is a diagram illustrating the flow of operation for estimating the speed of progression of a damage (crack) and for outputting an alarm by the tire information management server 200.
Figure 5:
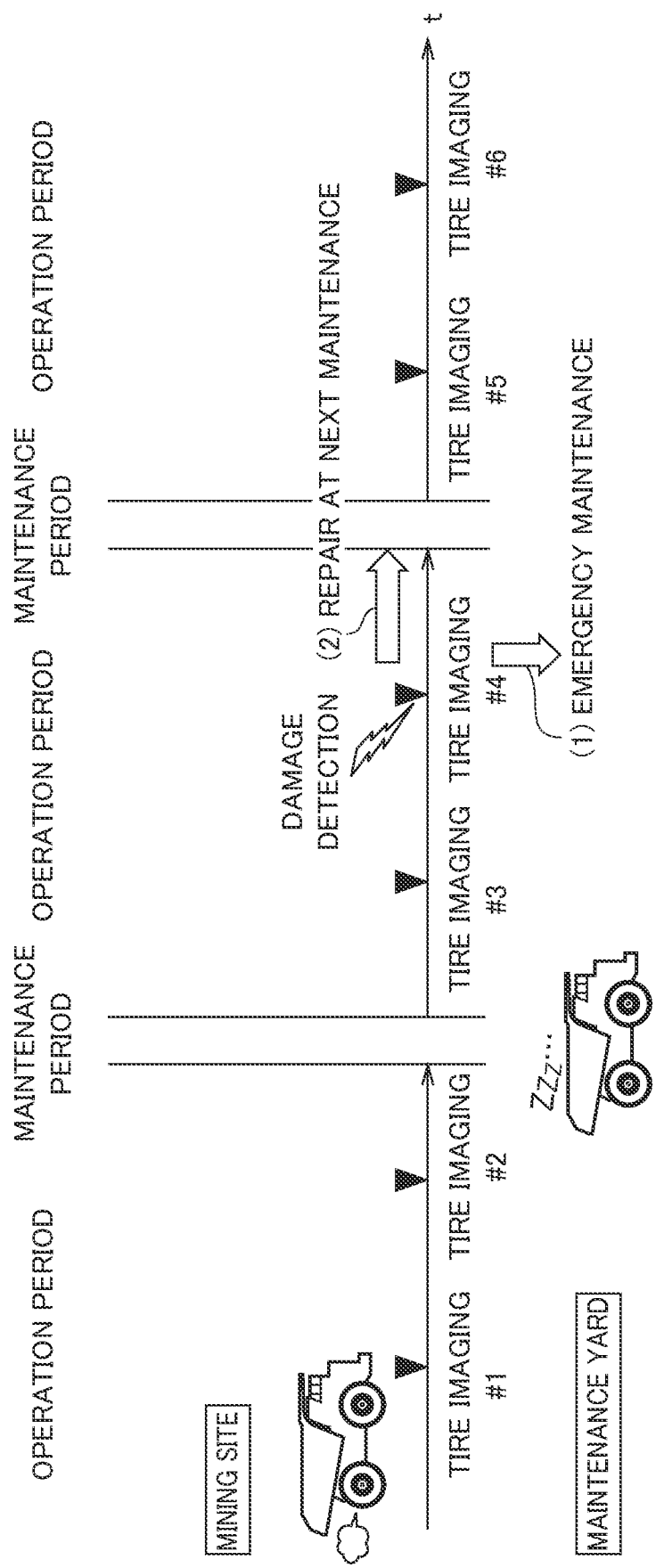
FIG. 5 is a diagram schematically illustrating an example of operation of a construction vehicle 20.

FIG. 4 shows an operation flow of estimating the progress speed of the damage (crack) and the alarm output by the tire information management server 200. FIG. 5 is a diagram schematically showing an operation example of the construction vehicle 20.

As shown in FIG. 4, the tire information management server 200 acquires image data (1st) of the tire 21 (S 10). Specifically, the worker 50 uses the portable terminal 100 to image the tire 21. The imaging timing (first timing) corresponds to, for example, the "Tire imaging (#1)" shown in FIG. 5.

Figure 6:
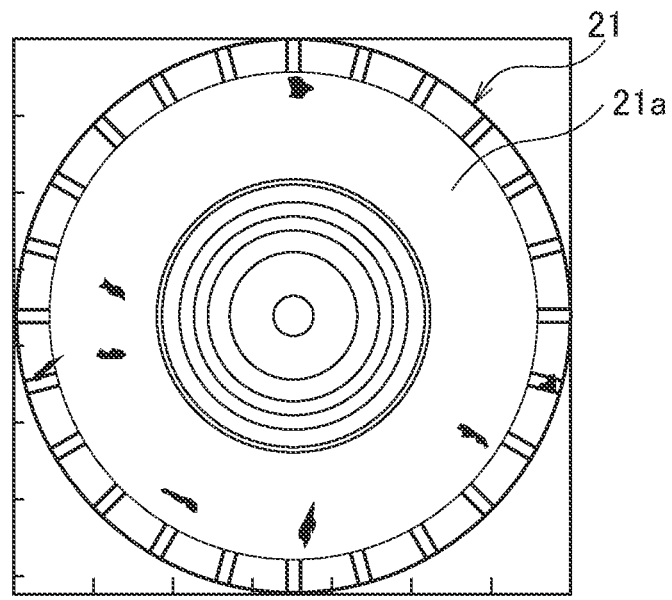
FIG. 6 shows an example of image data for the outer surface of the tire 21.

FIG. 6. shows an example of image data of the outer surface of the tire 21. Specifically, FIG. 6 shows an example of image data of the tire side portion 21a. In step 10, image data as shown in FIG. 6 is acquired.

The tire information management server 200 acquires a damage (crack) included in the image data (first image data) (1st) (S 20). As described above, the identification of the damage (crack) may be manually designated by the operator 50 or may be performed automatically by image processing.

When a predetermined period has elapsed since the 1st acquisition of the image data, the tire information management server 200 acquires the image data of the tire 21 (2nd) (S 30, S 40). The imaging timing (second timing) corresponds to, for example, the "Tire imaging (#2)" shown in FIG. 5.

As shown in FIG. 5, imaging of the tire 21 at a predetermined timing is repeated (Tire imaging (#3~6)).

The tire information management server 200 acquires a damage (crack) included in the image data (second image data) (2nd) (S 50).

The tire information management server 200 associates the 1st damage (crack) with the 2nd damage (crack) (S 60). As described above, the matching of the cracks may be manually designated by the operator 50 or may be automatically performed by image processing.

Figure 7:
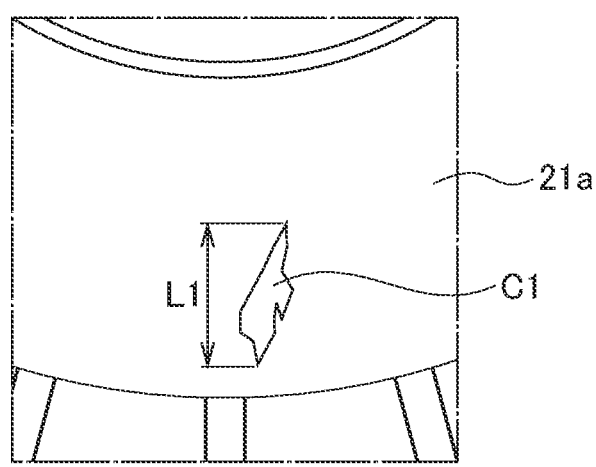
FIG. 7 is an enlarged view of a crack C1 included in the first image data.
Figure 8:
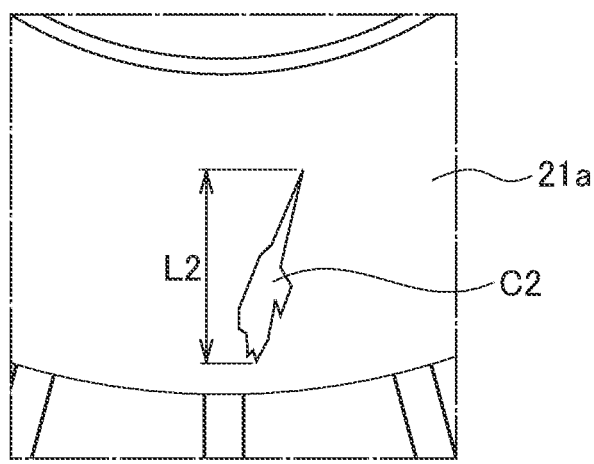
FIG. 8 is an enlarged view of a crack C2 contained in the second image data.

FIG. 7 is an enlarged view of the crack C1 included in the 1st time image data (first image data). FIG. 8 is an enlarged view of the crack C2 included in the 2nd time image data (second image data).

As shown in FIGS. 7 and 8, the crack C2 generated in the tire side portion 21a is caused by the growth of the crack C1. Specifically, the length L2 of the crack C2 is longer than the length L1 of the crack C1.

The tire information management server 200 estimates the future progress speed of the crack C1 (Length L1) based on the difference between the crack C2 (Length L2) and the operation information of the construction vehicle 20 (S 70).

The tire information management server 200 determines whether or not an alarm is necessary, that is, whether or not maintenance is necessary for the tire 21 based on the estimation result of the progress speed (S 80). Here, the maintenance is assumed to be emergency maintenance during the operation period in which the construction vehicle 20 is in operation at the mining site ((1) in FIG. 5), or maintenance of the tire 21 in accordance with the maintenance period in which the construction vehicle 20 is parked in the maintenance yard for the maintenance of itself ((2) of FIG. 5).

When the maintenance of the tire 21 is required, the tire information management server 200 outputs an alarm including the type of the (4) Function and effects According to the embodiment described above, the following effects can be obtained. Specifically, the tire state management system 10 (tire information management server 200) estimates the progress speed of the damage based on the damage (Crack C1) included in the 1st image data at the 1st timing and the damage (Crack C2) included in the 2nd image data at the 2nd timing after the 1st timing, and predicts the maintenance timing for the tire 21 based on the estimated progress speed and the operation information of the construction vehicle 20.

Therefore, the progress speed of the damage can be estimated with high accuracy, and the accurate maintenance timing of the tire 21 can be predicted. Thus, the operation interruption of the construction vehicle 20 due to the failure of the tire 21 can be more surely avoided.

In this embodiment, an alarm corresponding to the use limit timing of the tire 21 can be outputted. Specifically, an alarm indicating that the maintenance of the tire 21 is necessary or an alarm indicating that the maintenance of the tire 21 is necessary during the next maintenance period of the construction vehicle 20 can be outputted.

More specifically, depending on the use limit timing of the tire 21, emergency maintenance ((1) in FIG. 5) or maintenance of the tire 21 in accordance with the maintenance period of the construction vehicle 20 ((2) of FIG. 5) may be selected. Therefore, the optimum maintenance timing of the tire 21 can be reported while avoiding useless non-operation time of the construction vehicle 20.

Thus, the operation rate of the construction vehicle 20 can be further enhanced.

(5) Other Embodiments

While the contents of the present invention have been described in accordance with the above embodiments, it will be apparent to those skilled in the art that the present invention is not limited to these descriptions and that various modifications and improvements are possible.

For example, in the embodiment described above, the damage of the tire side portion 21a (crack) has been described as an example, but the object may be an outer surface of the tire 21 such as a tread portion or a bead portion if imaging is possible.

In the above-described embodiment, the portable terminal 100 is used to acquire image data of the outer surface of the tire 21, but a fixed camera may be installed at a gate through which the construction vehicle 20 passes so as to image the side surface of the tire 21 when the construction vehicle 20 passes.

Cracks C1 and C2 (Include Size) may be detected automatically by image processing. For example, based on the size of the rim wheel 30 (Include a rim flange 31), the sizes of the cracks C1 and C2 may be automatically detected.

In the above embodiment, a dump truck is described as an example, but other construction vehicles such as an articulated dump truck and a wheel loader may be used. In addition, the vehicle may be a large vehicle, specifically a tire mounted on a truck or bus, rather than a construction vehicle.

Although embodiments of the invention have been described as described above, the discussion and drawings which form part of this disclosure should not be construed as limiting the invention. Various alternative embodiments, embodiments and operational techniques will be apparent to those skilled in the art from this disclosure.

[Reference Signs List]
10 tire state management system
20 construction vehicle
21, 22 tires
21a tire side portion
30 rim wheel
31 rim flange portion
40 communication network
50 worker
60 terminal device
100 portable terminal
200 tire information management server
210 image data acquisition unit
220 damage portion acquisition unit
230 vehicle operation information acquisition unit
240 maintenance prediction unit
250 alarm output unit

The invention claimed is:

1. A tire state management system for estimating the damage progress speed of damage generated on the outer surface of a tire and managing the state of the tire, comprising:
   an image data acquisition unit for acquiring first image data acquired by imaging the outer surface at a first timing and second image data acquired by imaging the outer surface at a second timing later than the first timing;
   a damage portion acquiring unit for acquiring a first region of localized damage included in the first image data and a second region of localized damage included in the second image data, the first region of localized damage being associated with a region of localized damage crack;
   a vehicle operation information acquisition unit for acquiring operation information of a vehicle on which the tire is mounted, said operation information including operation history and operation schedule; and
   a maintenance prediction unit for estimating the damage progress speed based on a size of the first region of localized damage included in the first image data, a size of the second region of localized damage included in the second image data, and the operation information, and predicting the maintenance timing for the tire based on the progress speed and the operation information;

wherein the maintenance prediction unit predicts a use limit timing at which the tire reaches a use limit based on the damage progress speed and the operation information, and the tire state management system further comprising an alarm output unit for outputting an alarm corresponding to the use limit timing.

2. The tire state management system according to claim 1, wherein the alarm output unit outputs an alarm indicating that maintenance of the tire is necessary.

3. The tire state management system according to claim 1, wherein the alarm output unit outputs an alarm indicating that maintenance of the tire is necessary during the next maintenance period of the vehicle.

4. The tire state management system according to claim 1, wherein the maintenance prediction unit:

determines progress degree of the damage from a first timing to a second timing from a difference between information of the first region of localized damage included in the first image data and information of the second region of localized damage included in the second image data; and estimates a future damage progress speed of the damage based on the operation information of the vehicle from the first timing to the second timing and the operation information of the vehicle after the second timing.

5. The tire state management system according to claim 1, wherein the first region of localized damage is a first crack and the second region of localized damage is a second crack, the second crack being associated with the first crack by the second crack being caused by development of the first crack.

6. The non-transitory computer readable medium including the tire state management program according to claim 5, wherein the first region of localized damage is a first crack and the second region of localized damage is a second crack, the second crack being associated with the first crack by the second crack being caused by development of the first crack.

7. A non-transitory computer readable medium including a tire state management program for estimating the damage progress speed of damage generated on the outer surface of a tire and managing the state of the tire, the tire state management program causing a computer to execute:

an image data acquisition processing for acquiring first image data acquired by imaging the outer surface at a first timing and second image data acquired by imaging the outer surface at a second timing later than the first timing;

a damage portion acquiring process for acquiring a first region of localized damage included in the first image data and a second region of localized damage included in the second image data, the first region of localized damage being associated with the second region of localized damage;

a vehicle operation information acquiring process for acquiring operation information of a vehicle on which the tire is mounted, said operation information including operation history and operation schedule;

a maintenance prediction processing for estimating the damage progress speed based on a size of the first region of localized damage included in the first image data and a size of the second region of localized damage included in the second image data, and predicting the maintenance timing for the tire based on the damage progress speed and the operation information;

wherein the maintenance prediction processing predicts a use limit timing at which the tire reaches a use limit based on the damage progress speed and the operation information; and an alarm output processing for outputting an alarm corresponding to the use limit timing.

* * * * *